United States Patent Office 3,360,564
Patented Dec. 26, 1967

3,360,564
2,2-DIALKYLCYCLOBUTANONE AND 2,2-DI-ALKYLCYCLOBUTANOL COMPOUNDS AND PROCESSES FOR THEIR PREPARATION
James C. Martin and Paul Glenn Gott, Kingsport, Tenn., assignors to Eastman Kodak Company, Rochester, N.Y., a corporation of New Jersey
No Drawing. Filed Jan. 13, 1964, Ser. No. 337,171
4 Claims. (Cl. 260—586)

This invention relates to novel chemical compounds and to their preparation. More particularly, it relates to novel 2,2-dialkylcyclobutanone and 2,2-dialkylcyclobutanol compounds and to novel methods for preparing them.

The novel 2,2-dialkylcyclobutanone compounds of the invention have the formulas:

I. 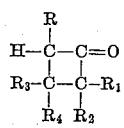

II. 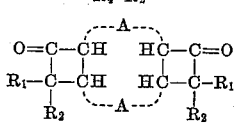

and

III. 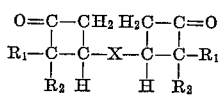

while the 2,2-dialkylcyclobutanol compounds of the invention have the formulas:

IV. 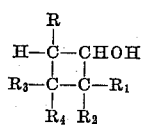

V. 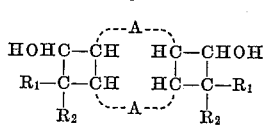

and

VI. 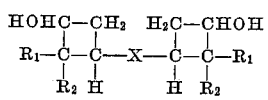

wherein A represents a methylene or an ethylene radical and wherein each A in any given compound is the same, R and $R_3$ each represents hydrogen or an alkyl radical, $R_1$ and $R_2$ each represents an alkyl radical, $R_4$ represents hydrogen, an alkyl radical or a cycloalkyl radical, X represents a straight chain alkylene radical having 1 to 4 carbon atoms, and wherein

collectively represents a carbocyclic ring.

$R_1$ and $R_2$ each typically represent an alkyl radical having 1 to 8 carbon atoms such as methyl, ethyl, propyl, isopropyl, butyl, sec. butyl, tert. butyl, pentyl, hexyl, heptyl, octyl, 2-ethylhexyl, etc. although they can be a higher alkyl radical such as nonyl, decyl, undecyl, dodecyl, tridecyl, pentadecyl and octadecyl, for example. In general, $R_1$ and $R_2$ are preferably lower alkyl, e.g., of 1 to 4 carbon atoms.

When R, $R_3$ and $R_4$ are alkyl each typically represents an alkyl radical having 1 to 20 carbon atoms such as methyl, ethyl, propyl, isopropyl, butyl, sec. butyl, tert. butyl, pentyl, hexyl, heptyl, octyl, 2-ethylhexyl, nonyl, decyl, undecyl, dodecyl, tridecyl, pentadecyl, octadecyl and eicosyl, for example. When alkyl, R, $R_3$ and $R_4$ are usually lower alkyl, e.g., of 1 to 4 carbon atoms.

When $R_4$ is a cycloalkyl radical it can be cyclobutyl, cyclopentyl, cyclohexyl and cycloheptyl, for example.

X represents a straight chain alkylene radical having 1 to 4 carbon atoms, i.e., methylene, ethylene, trimethylene and tetramethylene.

The

grouping collectively represents a carbocyclic ring such as 1,2-cyclopentylene, 1,2-cyclohexylene, 1,2-cycloheptylene, 1,2-cyclooctylene, 2,3-bicyclo [2.2.1] heptylene, etc.

Cyclobutanone compounds having the Formula I can be prepared by combining a dialkylketene having the formula:

VII 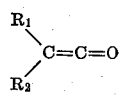

with an olefin having the formula:

VIII 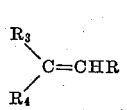

wherein R, $R_1$, $R_2$, $R_3$ and $R_4$ have the meaning previously assigned to them. From a practical viewpoint the use of α-olefins having the formula IX. $\qquad RCH=CH_2$ wherein R has the meaning previously assigned to it is preferred because of their commercial availability.

Cyclobutanone compounds having the Formula I and wherein

collectively represents a carbocyclic ring can be prepared by combining a dialkylketene having the Formula VII with a cyclic olefin such as cyclopentene, cyclohexene, cycloheptene, cyclooctene and bicyclo [2.2.1] hept-2-ene [2-norbornene], for example.

The cyclobutanone compounds having the Formula II are prepared by combining a dialkylketene having the Formula VII with a cyclic diene having the formula:

X.
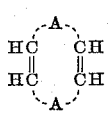

wherein each A is the same and represents a methylene or ethylene radical.

The cyclobutanone compounds having the Formula III are prepared by combining a dialkylketene having the Formula VII with a nonconjugated diolefin having the formula:

XI. $CH_2=CH(CH_2)_nCH=CH_2$ wherein $n$ represents 1, 2, 3 or 4.

Illustrative of the dialkylketenes having the formula VII are dimethylketene, ethylmethylketene, diethylketene, ethylpropylketene, ethylisopropylketene, dispropylketene, diisopropylketene, ethylbutylketene, dibutylketene, diisobutylketene, di(tert.butyl)ketene, dipentylketene, dihexylketene, diheptylketene, dioctylketene, di(2 - ethylhexyl)-ketene, ethyldodecylketene, didodecylketene, dipentadecylketene, dihexadecylketene and dioctadecylketene, for example.

Illustrative of the olefins that can be used in preparing the cyclobutanone compounds of the invention having the Formula I are ethylene, propylene, 1-butene(ethylethylene), 2 - butene(dimethylethylene), isobutylene, 2-methyl-1-butene, 2-methyl-2-butene, 1-pentene, 2-ethyl-1-pentene, $\Delta^1$-hexylene $(CH_2=CH(CH_2)_3CH_3)$, $\Delta^2$-hexylene $(CH_3CH=CH(CH_2)_2CH_3)$, $\Delta^3$-hexylene $(CH_3CH_2CH=CHCH_2CH_3)$ 1-heptene, 1 - octene $(CH_2=CH(CH_2)_5CH_3)$, 2 - octene $(CH_3CH=CH(CH_2)_4CH_3)$, 3-octene $(CH_3CH_2CH=CH(CH_2)_3CH_3)$ 1-nonene, 1-decene $(C_2=CH(CH_2)_7CH_3)$, decylethylene $(CH_2=CH(CH_2)_9CH_3)$, dodecylethylene, tridecylethylene, tetradecylethylene, pentadecylethylene, hexadecylethylene, heptadecylethylene, octadecylethylene, nonadecethylene, eicosylethylene, cyclobutylethylene, cyclopentylethylene, cyclohexylethylene, cyclopentene, cyclohexene, cycloheptene, cyclooctene, etc.

The cyclic dienes employed in preparing the cyclobutanone compounds having the Formula II are 1,4-cyclohexadiene and 1,5-cyclooctadiene.

The nonconjugated diolefins having the Formula XI are 1,7-octadiene, 1,6-heptadiene, 1,5-hexadiene and 1,4-pentadiene.

The novel cyclobutanol compounds of the invention can be prepared by reducing the novel cyclobutanone compounds of the invention. The reduction can be effected in any suitable manner desired. Thus the reduction can be effected with hydrides, such as lithium aluminum hydride, sodium borohydride, potassium borohydride, etc., or by catalytic hydrogenation. Suitable catalysts include Raney nickel, Raney cobalt, copper chromite, and such metals as nickel, cobalt, rhodium, ruthenium, platinum, palladium, etc., supported on an inert carrier such as alumina, charcoal, kieselguhr, etc. The catalytic hydrogenation is generally carried out at a temperature ranging from 25° C. to 150° C. and at pressures ranging from atmospheric to 5000 p.s.i. The choice of temperature and pressure is dependent upon the catalyst employed. The reduction of the cyclobutanone compounds can be carried out either without a solvent or in the presence of an inert solvent.

The novel process of the invention for the preparation of the novel 2,2-dialkylcyclobutanone compounds of the invention is preferably carried out at a temperature between 100° C. and 200° C., although lower and higher temperatures can be employed. A temperature in the upper end of the range stated is employed for the less reactive olefins and ketenes. Ordinarily, the reaction is carried out in a sealed autoclave because frequently the low boiling points of the olefins used do not permit a reflux temperature high enough to be effective. Varying molar ratios of ketene to olefin can be employed, depending on the nature of the reactants used. As understood by those skilled in the art ketenes are subject to dimerization and this is usually a competing reaction. It is beneficial to employ an excess of the olefin in order to suppress dimerization of the ketene.

The reaction can be carried out with or without a solvent. Suitable inert solvents include, for example, diethyl ether, diisopropyl ether, dioxane, tetrahydrofuran, diethylketone, methylisobutylketone, hexane, naphtha, isooctane, benzene, toluene, xylene, carbon tetrachloride, chloroform, tetrachloroethane, dimethyl formamide, dimethyl sulfoxide, acetonitrile, isobutyronitrile, ethyl acetate, butyl acetate, ethylene carbonate, etc.

The novel 2,2-dialkylcyclobutanone compounds of the invention are useful as chemical intermediates. As noted hereinbefore they can be reduced to 2,2-dialkylcyclobutanol compounds. The novel cyclobutanone compounds are useful as plasticizers for polyvinyl chloride and cellulose ester resins. Also they may be added to plastisol formulations to reduce the viscosity and facilitate pouring. Drastic reductions in the viscosity of plastisol formulations are often obtainable. The novel cyclobutanone compounds of the invention are particularly suited for this purpose because their high boiling points avoid the formation of bubbles during the fusion of the plastisol.

The novel cyclobutanol compounds of the invention are useful as intermediates in the preparation of surfactants. They are converted to useful surfactants by sulfation, e.g. with concentrated $H_2SO_4$ and conversion to the sodium sulfate salt. The sulfate of 2-butyl-2-ethyl-3,3-dimethylcyclobutanol, for example, in its sodium salt form is a surfactant that is useful as a light duty detergent and in shampoo formulations. The novel cyclobutanol compounds are also useful as defoaming agents in the manufacture of paper from wood pulp.

The following examples illustrate the invention:

Example 1

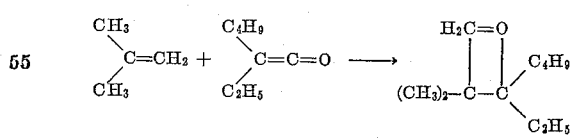

A solution of 252 g. (2 moles) of butylethylketene and 336 g. (6 moles) of isobutylene was heated in an autoclave at 180° C. for 8 hours. Examination of the reaction solution by vapor phase chromatography (VPC) showed some butylethylketene dimer together with a large new peak, presumed to be the product. Distillation through a 12-inch packed column gave 151 g. of 2-butyl-2-ethyl-3,3 - dimethylcyclobutanone, B.P. 84–88° C. (6 mm.), $n_D^{20}$ 1.4527; together with 14 g. of butylethylketene and 103 g. of butylethylketene dimer. Based on butylethylketene, this is a conversion of 42% and a yield of 78%.

*Analysis.*—Calcd. for $C_{12}H_{22}O$: C, 79.2; H, 12.1. Found: C, 79.3; H, 12.0. Infrared maximum at 5.65μ (cyclobutanone). Nuclear magnetic resonance (NMR)

peaks (in cycles per second relative to tetramethylsilane):
—CH$_2$— in ring —106,

—48, other —CH$_2$—'s —45 to —80, —CH$_3$ —35.

Example 2

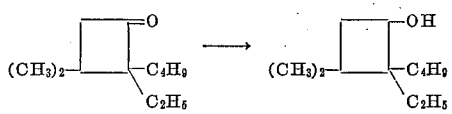

A solution of 75 g. (0.41 mole) of 2-butyl-2-ethyl-3,3-dimethylcyclobutanone in 100 ml. of ether was added slowly to 10 g. (0.26 mole) of lithium aluminum hydride in 500 ml. of ether. The temperature was kept at 10° C.±5° C. during the addition, then at 25° C. for 1 hour. Ethyl acetate was added to destroy the excess lithium aluminum hydride, then added 10 ml. of water, 10 ml. of 20% sodium hydroxide solution, then 40 ml. of water. The solid was removed by filtration and washed several times with ether. The filtrate was evaporated to give 77 g. of residue. Distillation of this material through a 12-inch packed column gave 62 g. (83%) of 2-butyl-2-ethyl-3,3-dimethylcyclobutanol, B.P. 98–99° C. (5.3 mm.).

*Analysis.*—Calcd. for C$_{12}$H$_{24}$O: C, 78.3; H, 13.1; mol. wt., 184. Found: C, 78.3; H, 13.5; mol. wt. (B.P. elevation in benzene), 189. Infrared maximum at 3.0$\mu$. NMR peaks (in carbon tetrachloride solution): —O—CH —149, —OH —133, all —CH$_2$'s —45 to —85

—40, other CH$_3$'s, —35.

This experiment is cited to show that the structure of the original adduct was as shown and not:

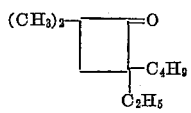

Two facts support this assignment: (1) the low NMR field position of the ring —CH$_2$— indicates it is adjacent to a

group, and (2) the proton in the hydroxyl group of the alcohol is split into a triplet as would be expected by an adjacent —CH$_2$— group.

Example 3

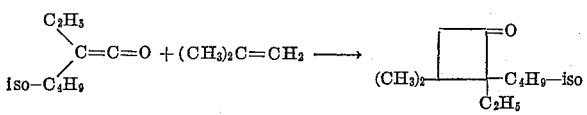

A solution of 63 g. (0.5 mole) of ethylisobutylketene and 140 g. (2.5 moles) of isobutylene was heated in an autoclave at 180° C. for 8 hours. Distillation of the reaction mixture through a 12-inch packed column gave 24 g. of unchanged ethylisobutylketene and 40.5 g. of 2-isobutyl-2-ethyl-3,3-dimethylcyclobutanone, B.P. 79° C. (5 mm.). Based on ethylisobutylketene a conversion of 44% and a yield of 71% was obtained.

Example 4

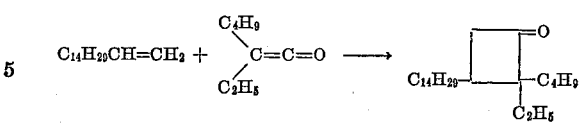

A mixture of 25 g. (0.2 mole) of butylethylketene and 90 g. (0.4 mole) of 1-hexadecene was heated in a stainless steel autoclave at 180° C. for 6 hours. Examination of the reaction solution by infrared showed an intense absorption at 5.63$\mu$ characteristic of cyclobutanone. The reaction mixture was distilled under vacuum to give 62 g. of a mixture of butylethylketene dimer and unchanged 1-hexadecene. The residue weighed 46 g. and was almost pure 2-butyl-2-ethyl-3-tetradecylcyclobutanone.

Example 5

A mixture of 38 g. (0.3 mole) of butylethylketene and 67 g. (0.6 mole) of 1-octene was heated in a stainless steel autoclave at 180° C. for 6 hours. The reaction solution was distilled through an 8-inch Vigreux column to give 39.5 g. of unchanged 1-octene and 57.7 g. of material, B.P. 107–109° C. (0.8 mm.). This material was shown by GLC (gas liquid chromatography), to be a mixture of 21.5% of butylyethylketene dimer and 78.5% of 2-butyl-2-ethyl-3-hexylcyclobutanone. Pure 2-butyl-2-ethyl-3-hexylcyclobutanone is recovered from the reaction mixture by isolation on a preparative scale gas liquid chromotography column or by distillation of the reaction mixture in an efficient column under vacuum. In the latter method the butylethylketene dimer is removed leaving a residue of almost pure 2-butyl-2-ethyl-3-hexylcyclobutanone.

Example 6

Butylethylketene, 34 g., was charged into a stainless steel autoclave and pressured to 500 p.s.i. with ethylene. The vessel was heated at 180° C. for 6 hours and the pressure was kept at 1500 p.s.i. by the addition of ethylene as needed. Examination of the reaction solution showed it to be about 80% butylethylketene dimer and 20% 2-butyl-2-ethylcyclobutanone. Pure 2-butyl-2-ethylcyclobutanone is recovered from the reaction mixture by means of either of the recovery procedures described in Example 5.

Example 7

A solution of 35 g. (0.5 mole) of dimethylketene and 224 g. (2.0 moles) of 1-octene is refluxed under a nitrogen atmosphere for 12 hours. Examination of the reaction solution by GLC shows unchanged 1-octene, dimethylketene dimer and 3-hexyl-2,2-dimethylcyclobutanone. Pure 3-hexyl-2,2-dimethylcyclobutanone is recovered from the reaction mixture by means of either of the recovery procedures described in Example 5.

Example 8

A solution of 38 g. of butylethylketene and 150 g. of C$_{15}$–C$_{20}$ α-olefins (California Chemical Co.) is heated at 200° C. for 10 hours in a flask equipped with a reflux condenser. The infrared spectrum of the reaction solution shows a large absorption at 5.62$\mu$, indicative of a cyclobutanone, and a lesser absorption at 5.72$\mu$, indicative of butylethylketene dimer. By distilling the reaction mixture under vacuum in an efficient column the butylethylketene dimer is removed leaving a residue containing a mixture of 2-butyl-2-ethyl-3-alkylcyclobutanone compounds wherein the 3-alkyl group contains 13 to 18 carbon atoms.

Under the same general conditions described in Example 1, the following ketenes and olefins give the products shown in the following tabulation.

TABLE 1

| Ketene | Olefin | Product |
| --- | --- | --- |
| Butylethylketene | 2,4,4-trimethyl-1-pentene | 2-butyl-2-ethyl-3-methyl-3-neopentyl-cyclobutanone. |
| Dimethylketene | Isobutylene | 2,2,4,4-tetramethyl-cyclobutanone. |
| Diethylketene | do | 2,2-diethyl-3,3-dimethylcyclobutanone. |
| Dioctylketene | do | 2,2-dioctyl-3,3-dimethylcyclobutanone. |
| Butylethylketene | 1-propene | 2-butyl-2-ethyl-3-methylcyclobutanone. |
| Do | 2-butene | 2-butyl-2-ethyl-3,4-dimethylcyclobutanone. |
| Isobutylethylketene | 2-pentene | 2-isobutyl-2,4-diethyl-3-methylcyclobutanone. |
| Dipropylketene | Isobutylene | 2,2-dipropyl-3,3-dimethylcyclobutanone. |
| Dibutylketene | do | 2,2-dibutyl-3,3-dimethylcyclobutanone. |
| Diisobutylketene | do | 2,2-diisobutyl-3,3-dimethylcyclobutanone. |
| Di(tert.butyl)ketene | do | 2,2-di(tert.butyl)-3,3-dimethylcyclobutanone. |
| Dipentylketene | 1-butene | 2,2-dipentyl-3-ethyl-cyclobutanone. |
| Dihexylketene | 1-pentene | 2,2-dihexyl-3-propylcyclobutanone. |
| Diheptylketene | Isobutylene | 2,2-diheptyl-3,3-dimethylcyclobutanone. |
| Didecylketene | do | 2,2-didecyl-3,3-dimethylcyclobutanone. |
| Ethyldodecylketene | do | 2-ethyl-2-dodecyl-3,3-dimethylcyclobutanone. |
| Dioctadecyl | do | 2,2-dioctadecyl-3,3-dimethylcyclobutanone. |
| Dimethylketene | 1-hexene | 2,2-dimethyl-3-butylcyclobutanone. |
| Diisopropylketene | 1-heptene | 2,2-diisopropyl-3-pentylcyclobutanone. |
| Butylethylketene | 1-octene | 2-butyl-2-ethyl-3-hexylcyclobutanone. |
| Dimethylketene | 3-octene | 2,2-dimethyl-4-butyl-3-ethylcyclobutanone. |
| Do | 1-decene | 2,2-dimethyl-3-octylcyclobutanone. |
| Diethylketene | Decylethylene | 2,2-diethyl-3-decylcyclobutanone. |
| Do | Dodecylethylene | 2,2-diethyl-3-dodecylcyclobutanone. |
| Dimethylketene | Pentadecylethylene | 2,2-dimethyl-3-pentadecylcyclobutanone. |
| Do | Octadecylethylene | 2,2-dimethyl-3-octadecylcyclobutanone. |
| Do | Eicosylethylene | 2,2-dimethyl-3-eicosylcyclobutanone. |

*Example 9*

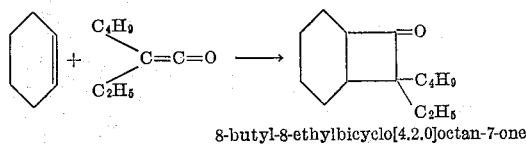

8-butyl-8-ethylbicyclo[4.2.0]octan-7-one

A mixture of 63 g. (0.5 mole) of butylethylketene and 164 g. (2.0 moles) of cyclohexene was heated at 180° C. for 12 hours. Distillation of the reaction solution through a 12-inch packed column gave 132 g. of unchanged cyclohexene and 71 g. of product, B.P. 90.5–93° C. (0.75 mm.). This material was found to be 31% 2,4-dibutyl-2,4-diethyl-1,3-cyclobutanedione and 69% 8-butyl-8-ethylbicyclo[4.2.0]octan-7-one by vapor phase chromatography. A sample of the latter material (the desired product) was separated by preparative vapor phase chromatography.

*Analysis.*—Calcd. for $C_{14}H_{24}O$: C, 80.8; H, 11.5; mol. wt. 208. Found: C, 80.7; H, 11.5; mol. wet. (ebullioscopic in benzene), 207.

*Example 10*

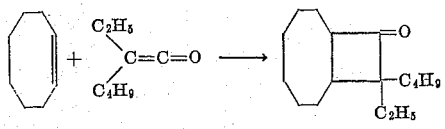

10-butyl-10-ethylbicyclo[6.2.0]decan-9-one

A mixture of 34 g. (0.27 mole) of butylethylketene and 57 g. (0.52 mole) of cyclooctene was heated in an autoclave at 180° C. for 8 hours. The reaction solution was distilled through a 12-inch packed column to give 37 g. of recovered cyclooctene and (A) B.P. 113–115° C. (0.9 mm.) 30 g.

(B) B.P. 115° C. (0.9 mm.) 14 g., $n_D^{20}$ 1.4854 B was pure 10-butyl-10-ethylbicyclo[6.2.0]decan-9-one and A was a mixture of 28% 2,4-dibutyl-2,4-diethyl-1,3-cyclobutanedione and 72% 10-butyl-10-ethylbicyclo[6.2.0]decan-9-one.

Following the general procedure described in Examples 9 and 10 the ketenes and olefins set forth in the following tabulation give the products named.

TABLE 2

| Ketene | Olefin | Product |
| --- | --- | --- |
| Dimethylketene | Cyclopentene | 7,7-dimethylbicyclo[3.2.0]-heptan-6-one. |
| Butylethylketene | do | 7-butyl-7-ethylbicyclo[3.2.0]-heptan-6-one. |
| Dibutylketene | do | 7,7-dibutylbicyclo[3.2.0]-heptan-6-one. |
| Dimethylketene | Cyclohexene | 8,8-dimethylbicyclo[4.2.0]-octan-7-one. |
| Dibutylketene | do | 8,8-dibutylbicyclo[4.2.0]-octan-7-one. |
| Dioctylketene | do | 8,8-dioctylbicyclo[4.2.0]-octan-7-one. |
| Dimethylketene | Cycloheptene | 9,9-dimethylbicyclo[5.2.0]-nonan-8-one. |
| Butylethylketene | do | 9-butyl-9-ethylbicyclo[5.2.0]-nonan-8-one. |
| Dibutylketene | do | 9,9-dibutylbicyclo[5.2.0]-nonan-8-one. |
| Dimethylketene | Cyclooctene | 10,10-dimethylbicyclo[6.2.0]-decan-9-one. |
| Butylethylketene | do | 10-butyl-10-ethylbicyclo[6.2.0]-decan-9-one. |
| Dibutylketene | do | 10,10-dibutylbicyclo[6.2.0]-decan-9-one. |
| Dimethylketene | Bicyclo[2.2.1]-hept-2-ene | 4,4-dimethyltricyclo[4.2.1.0$^{2,5}$]-nonan-3-one. |
| Butylethylketene | do | 4-butyl-4-ethyltricyclo[4.2.1.0$^{2,5}$]-nonan-3-one. |
| Dibutylketene | do | 4,4-dibutyltricyclo[4.2.1.0$^{2,5}$]-nonan-3-one. |
| Dioctylketene | do | 4,4-dioctyltricyclo[4.2.1.0$^{2,5}$]-nonan-3-one. |
| Isobutylethylketene | Cyclopentene | 7-isobutyl-7-ethylbicyclo[3.2.0]-heptan-6-one. |
| Dibutylketene | 3-methylcyclohexene | 5-methyl-8,8-dibutylbicyclo[4.2.0]-octan-7-one. |

*Example 11*

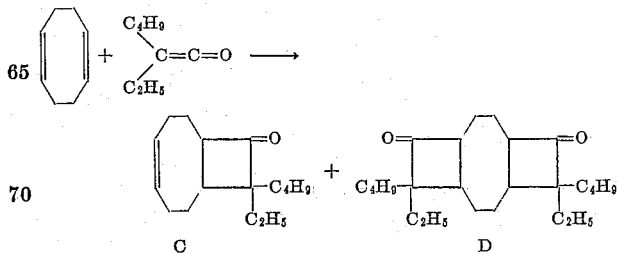

A mixture of 68 g. (0.54 mole) of butylethylketene and 29.3 g. (0.27 mole) of 1,5-cyclooctadiene was heated in an autoclave at 180° C. for 8 hours. The reaction mixture was distilled through a 12-inch packed column to give 7 g. of unchanged 1,5-cyclooctadiene and the following fractions:

(A) B.P. 94–98° C. (0.4 mm.), 26 g.
(B) B.P. 98–104° C. (0.4 mm.), 15 g.
(C) B.P. 104.5° C. (0.4 mm.), 10 g. $n_D^{20}$ 1.4918.
(D) B.P. 194–199° C. (0.75 mm.), 22 g. $n_D^{20}$ 1.4958.

Fraction C was pure 10-butyl-10-ethylbicyclo[6.2.0]dec-4-en-9-one (I); Fraction D was pure 6,11-dibutyl-6,11-diethyltricyclo[8.2.0.0$^{4,7}$]dodecane-5,12-dione; Fraction A (by vapor phase chromatography) was 89% 2,4-dibutyl-2,4-diethyl-1,3-cyclobutane-dione (II) and 11% I, Fraction B was 27% II and 73% I.

Under the same general conditions described in Example 11, the following ketenes and olefins give the products shown in the following tabulation.

A mixture of 30 g. (0.27 mole) of 1,7-octadiene and 76 g. (0.6 mole) of butylethylketene was heated in an autoclave at 180° C. for 6 hrs. Distillation of the reaction mixture through a 6-in. Vigreux column gave 5 g. of unchanged 1,7-octadiene and the following fractions:

(A) B.P. 90–93° C. (0.4 mm.), 60 g.
(B) B.P. 178° C. (0.2 mm.), 18 g.

Fraction A was a mixture of 50% 2,4-dibutyl-2,4-diethyl-1,3-cyclobutanedione and 50% of 2-butyl-2-ethyl-3-(9-dodecenyl)cyclobutanone; Fraction B was pure 3,3'-tetramethylenebis(2-butyl-2-ethylcyclobutanone). The two components of Fraction A can be separately recovered by means of a preparative scale gas chromatography column.

*Analysis.*—Calcd. for $C_{24}H_{43}O_2$: C, 79.5; H, 11.6; mol. wt., 363. Found: C, 79.6; H, 11.7; mol. wt. (ebullioscopic in benzene), 372.

TABLE 3

| Ketene | Olefin | Product |
| --- | --- | --- |
| Dimethylketene | 1,5-cyclooctadiene | 6,6-dimethyl-11,11-dimethyltricyclo[8.2.0.0.$^{4,7}$]dodecane-5,12-dione. |
| Diethylketene | do | 6,6-diethyl-11,11-diethyltricyclo[8.2.0.0.$^{4,7}$]dodecane-5,12-dione. |
| Dioctylketene | do | 6,6-dioctyl-11,11-dioctyltricyclo[8.2.0.0$^{4,7}$]dodecane-5,12-dione. |
| Dimethylketene | 1,4-cyclohexadiene | 5,5-dimethyl-9,9-dimethyltricyclo[6.2.0.0$^{3,6}$]decane-4,10-dione. |
| Diethylketene | do | 5,5-diethyl-9,9-diethyltricyclo[6.2.0.0$^{3,6}$]decane-4,10-dione. |
| Butylethylketene | do | 5,9-dibutyl-5,9-diethyltricyclo[6.2.0.0$^{3,6}$]decane-4,10-dione. |
| Dioctylketene | do | 5,5-dioctyl-9,9-dioctyltricyclo[6.2.0.0$^{3,6}$]decane-4,10-dione. |

*Example 12*

A mixture of 53 g. (0.42 mole) of butylethylketene and 59 g. (0.84 mole) of 2-pentene was heated in an autoclave at 180° C. for 8 hrs. Distillation of the reaction mixture through a 12-in. packed column gave the following fractions:

(A) Unchanged 2-pentene, 44 g.
(B) B.P. 80–84° C. (1.5 mm.), 28 g.
(C) B.P. 85–110° C. (1.5 mm.), 7 g.
(D) B.P. 110° C. (1.3 mm.), 21 g.

By VPC, Fraction B was pure 2-butyl-2,4-diethyl-3-methylcyclobutanone (I); Fraction C was a mixture of 65% I and 35% 2,4-dibutyl-2,4-diethyl-1,3-cyclobutanedione (II); Fraction D was pure II.

*Example 13*

Following the general procedure described in Example 13, the ketenes and olefins set forth in the following tabulation give the products named.

TABLE 4

| Ketene | Olefin | Product |
| --- | --- | --- |
| Dimethylketene | 1,7-octadiene | 3,3'-tetramethylenebis(2,2'-dimethylcyclobutanone). |
| Diethylketene | do | 3,3'-tetramethylenebis(2,2'-diethylcyclobutanone). |
| Dioctylketene | do | 3,3'-tetramethylenebis(2,2'-dioctylcyclobutanone). |
| Dimethylketene | 1,6-heptadiene | 3,3'-trimethylenebis(2,2'-dimethylcyclobutanone). |
| Diethylketene | do | 3,3'-trimethylenebis(2,2'-diethylcyclobutanone). |
| Butylethylketene | do | 3,3'-trimethylenebis(2-butyl-2-ethylcyclobutanone). |
| Dioctylketene | do | 3,3'-trimethylenebis(2,2'-dioctylcyclobutanone). |
| Dimethylketene | 1,5-hexadiene | 3,3'-ethylenebis(2,2'-dimethylcyclobutanone). |
| Diethylketene | do | 3,3'-ethylenebis(2,2'-diethylcyclobutanone). |
| Butylethylketene | do | 3,3'-ethylenebis(2-butyl-2-ethylcyclobutanone). |
| Dioctylketene | do | 3,3'-ethylenebis(2,2'-dioctylcyclobutanone). |
| Dimethylketene | 1,4-pentadiene | 3,3'-methylenebis(2,2'-dimethylcyclobutanone). |
| Diethylketene | do | 3,3'-methylenebis(2,2'-diethylcyclobutanone). |
| Butylethylketene | do | 3,3'-methylenebis(2-butyl-2-ethylcyclobutanone). |
| Dioctylketene | do | 3,3'-methylenebis(2,2'-dioctylcyclobutanone). |

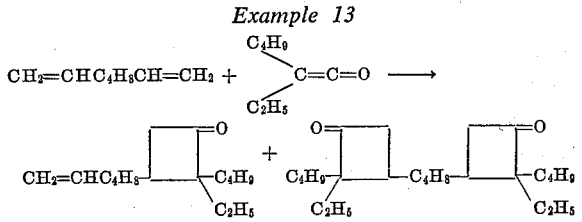

*Example 14*

A solution of 75 g. of 2-butyl-2-ethyl-3,3-dimethylcyclobutanone in 200 ml. of ethyl alcohol is hydrogenated in a stainless steel autoclave over 2 g. of 5% ruthenium on powdered carbon at 80° C. and 1000 p.s.i. for 2 hrs. The autoclave is cooled, vented, and the contents filtered. Distillation of the filtrate gives a high yield of 2-butyl-2-ethyl-3,3-dimethylcyclobutanol.

*Example 15*

Under the general conditions of Example 14 the use of 5 g. of Raney nickel in place of the ruthenium catalyst gives 2-butyl-2-ethyl-3,3-dimethylcyclobutanol.

*Example 16*

Under the general conditions of Example 14 the use of 5 g. of powdered copper chromite at 150° C. and 5000 p.s.i. for 3 hr. in place of the ruthenium catalyst gives 2-butyl-2-ethyl-3,3-dimethylcyclobutanol.

Following the general procedure described hereinbefore and which is illustrated in Examples 2, 14, 15 and 16 the 2,2-dialkylcyclobutanol compounds named in the following tabulation are obtained from the corresponding 2,2-dialkylcyclobutanone compound, e.g., 2-butyl-2-ethyl-3,3-dimethylcyclobutanol is obtained from 2-butyl-2-ethyl-3,3-dimethylcyclobutanone.

TABLE 5

2-isobutyl-2-ethyl-3,3-dimethylcyclobutanol
2-butyl-2-ethyl-3-tetradecylcyclobutanol
2-butyl-2-ethyl-3-hexylcyclobutanol
2-butyl-2-ethylcyclobutanol
3-hexyl-2,2-dimethylcyclobutanol
2-butyl-2-ethyl-3-methyl-3-neopentylcyclobutanol
2,2,4,4-tetramethylcyclobutanol
2,2-diethyl-3,3-dimethylcyclobutanol
2,2-dioctyl-3,3-dimethylcyclobutanol
2-butyl-2-ethyl-3-methylcyclobutanol
2-butyl-2-ethyl-3,4-dimethylcyclobutanol
2-isobutyl-2,4-diethyl-3-methylcyclobutanol
2,2-dipropyl-3,3-dimethylcyclobutanol
2,2-dibutyl-3,3-dimethylcyclobutanol
2,2-diisobutyl-3,3-dimethylcyclobutanol
2,2-di(tert.butyl)-3,3-dimethylcyclobutanol
2,2-dipentyl-3-ethylcyclobutanol
2,2-dihexyl-3-propylcyclobutanol
2,2-diheptyl-3,3-dimethylcyclobutanol
2,2-didecyl-3,3-dimethylcyclobutanol
2-ethyl-2-dodecyl-3,3-dimethylcyclobutanol
2,2-dioctadecyl-3,3-dimethylcyclobutanol
2,2-dimethyl-3-butylcyclobutanol
2,2-diisopropyl-3-pentylcyclobutanol
2-butyl-2-ethyl-3-hexylcyclobutanol
2,2-dimethyl-4-butyl-3-ethylcyclobutanol
2,2-dimethyl-3-octylcyclobutanol
2,2-diethyl-3-decylcyclobutanol
2,2-diethyl-3-dodecylcyclobutanol
2,2-dimethyl-3-pentadecylcyclobutanol
2,2-dimethyl-3-octadecylcyclobutanol
2,2-dimethyl-3-eicosylcyclobutanol
8-butyl-8-ethylbicyclo[4.2.0]octan-7-ol
10-butyl-10-ethylbicyclo[6.2.0]decan-9-ol
7,7-dimethylbicyclo[3.2.0]heptan-6-ol
7-butyl-7-ethylbicyclo[3.2.0]heptan-6-ol
7,7-dibutylbicyclo[3.2.0]heptan-6-ol
8,8-dimethylbicyclo[4.2.0]octan-7-ol
8,8-dibutylbicyclo[4.2.0]octan-7-ol
8,8-dioctylbicyclo[4.2.0]octan-7-ol
9,9-dimethylbicyclo[5.2.0]nonan-8-ol
9-butyl-9-ethylbicyclo[5.2.0]nonan-8-ol
9,9-dibutylbicyclo[5,2,0]nonan-8-ol
10,10-dimethylbicyclo[6.2.0]decan-9-ol
10-butyl-10-ethylbicyclo[6.2.0]decan-9-ol
10,10-dibutylbicyclo[6.2.0]decan-9-ol
4,4-dimethyltricyclo[4.2.1.0$^{2,5}$]nonan-3-ol
4-butyl-4-ethyltricyclo[4.2.1.0$^{2,5}$]nonan-3-ol
4,4-dibutyltricyclo[4.2.1.0$^{2,5}$]nonan-3-ol
4,4-dioctyltricyclo[4.2.1.0$^{2,5}$]nonan-3-ol
7-isobutyl-7-ethylbicyclo[3.2.0]heptan-6-ol
5-methyl-8,8-dibutylbicyclo[4.2.0]octan-7-ol
6,11-dibutyl-6,11-diethyltricyclo[8.2.0.0$^{4,7}$]dodecane-5,12-diol
6,6-dimethyl-11,11-dimethyltricyclo[8.2.0.0$^{4,7}$]dodecane-5,12-diol
6,6-diethyl-11,11-diethyltricyclo[8.2.0.0$^{4,7}$]dodecane-5,12-diol
6,6-dioctyl-11,11-dioctyltricyclo[8.2.0.0$^{4,7}$]dodecane-5,12-diol
5,5-dimethyl-9,9-dimethyltricyclo[6.2.0.0$^{3,6}$]decane-4,10-diol
5,5-diethyl-9,9-diethyltricyclo[6.2.0.0$^{3,6}$]decane-4,10-diol
5,9-dibutyl-5,9-diethyltricyclo[6.2.0.0$^{3,6}$]decane-4,10-diol
5,5-dioctyl-9,9-dioctyltricyclo[6.2.0.0$^{3,6}$]decane-4,10-diol
2-butyl-2,4-diethyl-3-methylcyclobutanol
3,3'-tetramethylenebis(2,2'-dimethylcyclobutanol)
3,3'-tetramethylenebis(2,2'-diethylcyclobutanol)
3,3'-tetramethylenebis(2-butyl-2-ethylcyclobutanol)
3,3'-tetramethylenebis(2,2'-dioctylcyclobutanol)
3,3'-triemthylenebis(2,2'-dimethylcyclobutanol)
3,3'-trimethylenebis(2,2'-diethylcyclobutanol)
3,3'-trimethylenebis(2-butyl-2-ethylcyclobutanol)
3,3'-trimethylenebis(2,2'-dioctylcyclobutanol)
3,3'-ethylenebis(2,2'-dimethylcyclobutanol)
3,3'-ethylenebis(2,2'-diethylcyclobutanol)
3,3'-ethylenebis(2-butyl-2-ethylcyclobutanol)
3,3'-ethylenebis(2,2'-dioctylcyclobutanol)
3,3'-methylenebis(2,2'-dimethylcyclobutanol)
3,3'-methylenebis(2,2'-diethylcyclobutanol)
3,3'-methylenebis(2-butyl-2-ethylcyclobutanol)
3,3'-methylenebis(2,2'-dioctylcyclobutanol)

The specific examples given hereinbefore are illustrative and not limitative of the invention.

The ketene compounds employed in the preparation of the novel compounds of the invention can be prepared by methods known in the art, for instance, by methods described in "Organic Reactions," John Wiley and Sons, Inc., N.Y. (1946) vol. III, Chapter 3. The ketene reactants can also be prepared by the method described in copending application, Hasek and Elam, Ser. No. 841,961, filed Sept. 24, 1959 now Patent No. 3,201,474 and in Hasek and Elam Canadian Patent 618,772.

Although the invention has been described in considerable detail with particular reference to certain preferred embodiments thereof, variations and modifications can be effected within the spirit and scope of the invention as described hereinbefore, and as defined in the appended claims.

We claim:
1. A process for preparing the compounds having the formula:

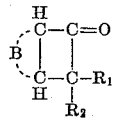

which comprises reacting at from 100 to 200° C. a dialkylketene having the formula:

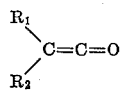

with a cyclic olefin selected from the group consisting of cyclopentene, cyclohexene, 3-methylcyclohexene, cycloheptene, cyclooctene and bicyclo[2.2.1]hept-2-ene and wherein in the foregoing formulas $R_1$ and $R_2$ each represents an alkyl radical and

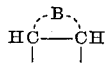

collectively represents a member selected from the group consisting of 1,2-cyclopentylene, 1,2-cyclohexylene, 3-methylcyclohexylene, 1,2-cycloheptylene and 2,3-bicyclo[2.2.1]heptylene.

2. A process in accordance with claim 1 wherein $R_1$ and $R_2$ each represents an alkyl radical having 1 to 4 carbon atoms.

3. A process in accordance with claim 2 wherein $R_1$ represents an ethyl group and $R_2$ represents a n-butyl group.

4. A process in accordance with claim 3 wherein the cyclic olefin is cyclohexene.

(References on following page)

References Cited

Adams et al., "Organic Reactions," vol. 12, pp. 26, 27, 32 and 48 to 50 (1962).

Bestian et al., "Angew. Chem.," vol. 75 (18), pp. 841 to 845 (1963).

Colonge et al., "Ann. Chem.," vol. 18, pp. 320 to 321 (1943).

Hasek, "Research," vol. 14, pp. 74 to 76 (1961).

Hasek, "J. Org. Chem.," vol. 28, p. 1468 (1963).

Staudinger and Meyer, Helv. Chem. Acta., vol. 7, p. 19 (1924).

LEON ZITVER, *Primary Examiner.*

M. M. JACOB, *Assistant Examiner.*